United States Patent [19]

Coutarel

[11] 4,002,908
[45] Jan. 11, 1977

[54] PROGRAM SELECTION, PARTICULARLY FOR LIQUID SCINTILLATION SPECTROMETERS

[75] Inventor: Yves Coutarel, Montrouge, France
[73] Assignee: Intertechnique, Plaisir, France
[22] Filed: July 7, 1975
[21] Appl. No.: 593,563
[30] Foreign Application Priority Data
  July 5, 1974  France ............................. 74.23515
[52] U.S. Cl. ............................... 250/328; 250/271; 250/369; 250/569
[51] Int. Cl.² ............................................ G01T 1/00
[58] Field of Search .................... 250/328, 567, 569
[56] References Cited
UNITED STATES PATENTS 3,749,916  7/1973  Thomas et al. ..................... 250/328
3,805,071  4/1974  Frank ................................ 250/328

Primary Examiner—Harold A. Dixon
Attorney, Agent, or Firm—Lane, Aitken, Dunner & Ziems

[57] ABSTRACT

A sample radioactivity measuring system has a conveyor for moving a plurality of sample receiving locations in succession to a working position. A device for selecting the measuring program to be executed on the samples comprises a plurality of marker plugs each adapted to be removably located in the conveyor for movement by the conveyor. Each marker is provided with a different address code. Each address code corresponds to a location in a card reader. Cards insertable into the addressed locations each carry one of the programs and the program read from the card at the addressed location is used for processing the associated samples.

8 Claims, 7 Drawing Figures

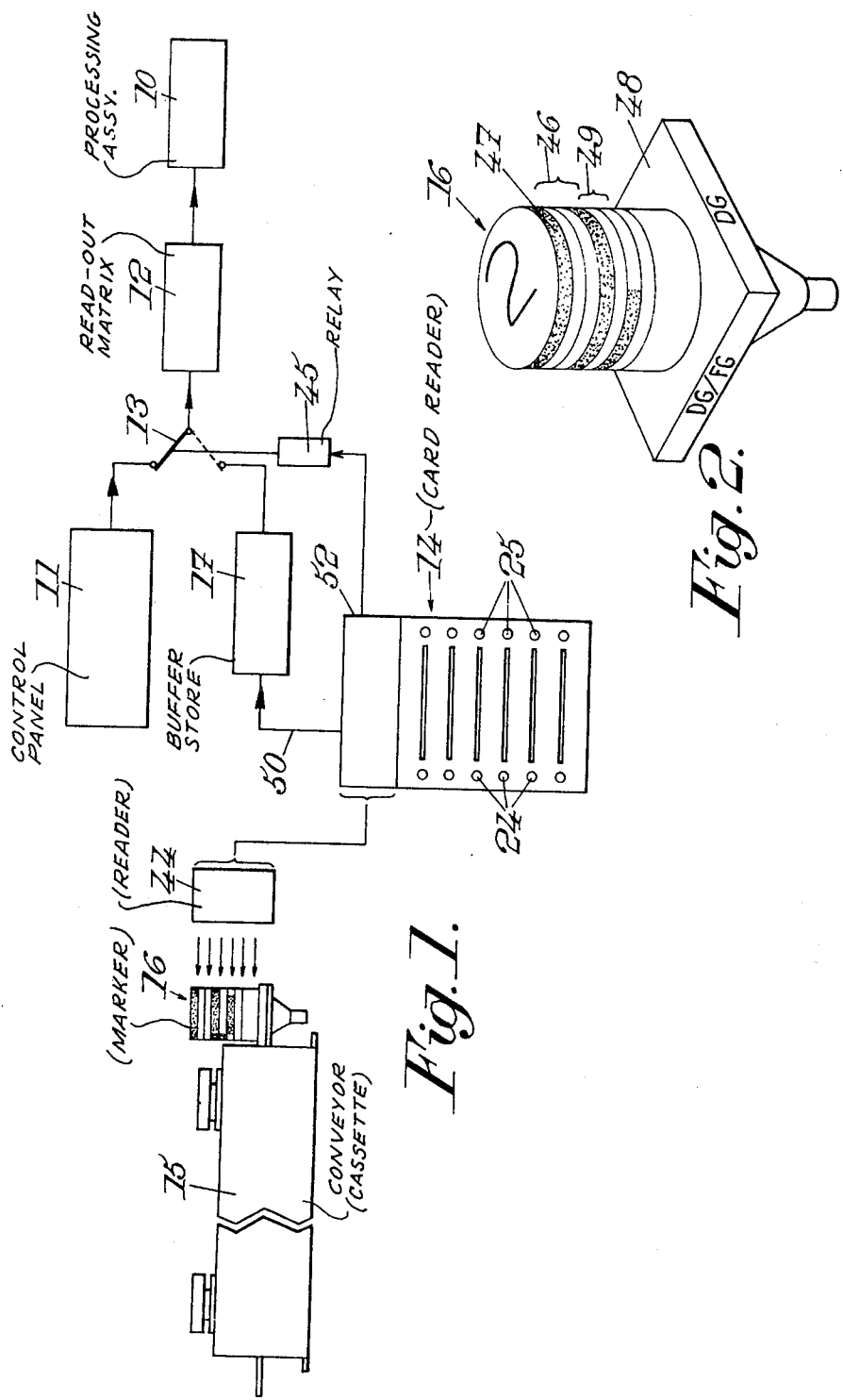

PROGRAM SELECTION, PARTICULARLY FOR LIQUID SCINTILLATION SPECTROMETERS

BACKGROUND OF THE INVENTION

The invention relates to a device for program selection, for selecting a program to be carried out by an apparatus on a group of successive samples. The program may typically be a measuring program, for instance for measuring beta or gamma activity of samples.

It is frequently necessary to perform a number of processing or measuring operations which are similar, but not entirely identical, on a large number of samples successively brought by a conveyor to a working station (or a number of working stations operated in parallel). Frequently, the samples may be associated in "groups," the samples in a given group being subjected to exactly the same operations whereas samples belonging to different groups do not undergo the same processing steps. An example of such a situation is the determination of the beta activity of successive samples by liquid scintillation spectrometry. In this case, activities of samples belonging to different groups are frequently measured using different counting parameters (energy selection window, duration of counting, standardization curve, etc). Other examples are the preparation of liquid samples by combustion and absorption, e.g. using the process described in French Pat. No. EN 70 36 644 (Intertechnique) and the determination of gamma activity of samples, using a scintillation crystal.

Prior art devices have been employed for selecting a program to be carried out on the successive samples of a group. Such a device is described in U.S. Pat. No. 3,749,916 and French Pat. Specification No. 1,552,274 (Intertechnique). That device, for selecting a program to be carried out on a number of successive samples disposed in a conveyor which brings them to a working station, comprises a marker which is associated with the group and moved along with the group by a link conveyor. The marker is coded with the address of the program in an auxiliary store (for instance a teletype punched tape) and causes the addressed program to be transferred to a main store where it is kept during the entire processing of the samples of the group. This solution is quite flexible but does require a programming operation necessitating a qualified operator and in addition does not provide a permanent program support which is directly and visually readable by an operator.

Other prior art systems use "wired" programs; the front panel of the apparatus comprises banks of switches or potentiometers in number equal to the number of groups between which the samples may be divided, and the most important parameters of the processes can be displayed in each bank by means of the switches and potentiometers. As before, the wired program is selected by a marker associated with the group. A system of this kind is expensive if the number of groups required and the number or parameters to be programmed are large; no permanent record is available.

SUMMARY OF THE INVENTION

An object of the invention is to provide a device improved with respect to the prior art devices, inter alia by avoiding the aforementioned disadvantages while being flexible, adapted to modify a large number of parameters on a large number of different groups, so that it is consistent with the high-capacity measuring systems now available for simultaneous use by a number of experimentors.

According to an aspect of the invention, there is provided a device for selecting a program to be carried out by an apparatus on a group of samples disposed in successive sample receiving locations of a conveyor of the apparatus, said conveyor being constructed to bring said locations to a working station in seriatim order, wherein said device comprises a plurality of markers each adapted to be removably located in said conveyor for movement by said conveyor along with said samples and each provided with a different address code, auxiliary stores in the form of cards each bearing one of said programs, read-out means having a plurality of addressable card receiving locations and means for reading the card located at an addressed location, means for reading the address code of each marker as it is moved toward the working position for causing said read out means to read the card at the location having the address read by said reading means and for transferring the program read out from the card to storage means controlling the process carried out by said system.

The marker may be similar to that described in the aforementioned French specification No. 1,552,274. Alternately, if the conveyor used is not a chain conveyor but a conveyor comprising cassettes (inter alia of the kind described and claimed in patent application Ser. No. 592,328, filed July 1, 1975, corresponding to French Pat. No. 74 23 518), the marker can be a coded plug placed in the first cassette containing samples belonging to the group.

The marker may be constructed not only to determine the program to be performed on the samples in the associated group, but also to indicate whether the samples in the corresponding cassette form the beginning of a group, the end of a group, or both the beginning and the end of a group (when a group is contained in a single cassette). The markers are typically plugs having a coding which is determined once for all, in which case the operator simply positions in the conveyor the marker indicating the address of the program, i.e. the position in which he has placed the card representing the program which he desires to carry out.

Advantageously, the card comprises a diagrammatic representation of the front panel of the apparatus provided with the device, and simply has to be marked showing the choice made. The programming can then be carried out by an experimentor remote from the apparatus. The program card can be joined to the samples as soon as they are prepared and can accompany them, thus reducing the qualifications required from the operator of the apparatus. After use, a card or a reproduction thereof can be stored with the measured results, thus giving a permanent record of the conditions under which the results were obtained.

The invention will be better understood from the following description of a device constituting a particular embodiment thereof. The description refers to the accompanying drawings.

SHORT DESCRIPTION OF THE DRAWINGS

FIG. 1 is a block diagram of the device, showing the main components and a cassette provided with a marker and disposed opposite code reading-out means;

FIG. 1a, similar to FIG. 1, shows a modified embodiment;

FIG. 2 shows a marker for use in the device in FIG. 1;

DESCRIPTION OF PREFERRED EMBODIMENTS

Figure 2A:
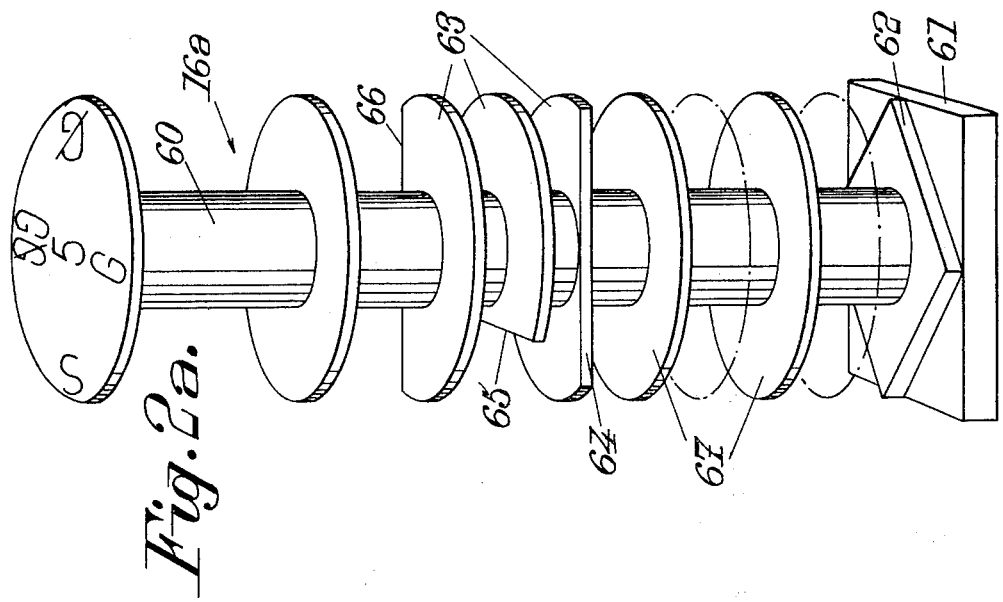
FIG. 2a shows a modified embodiment of the marker of FIG. 2 and an associated block diagram.

Referring to FIG. 1, there is illustrated in block form a device comprising a liquid scintillation spectrometer, constituting a processing assembly 10; the spectrometer is provided with a control panel 11 carrying manually selectable controls for adjusting the measuring parameters. A read-out matrix 12 transfers the data adjusted and displayed on panel 11 to a main store forming part of the processing system 12 when a routing system, diagrammatically represented as a single switch 13, connects matrix 12 to panel 11. The device also comprises a card reader 14 which in the illustrated embodiment has six positions numbered 1 to 6 and each adapted to receive a card 23. The position of a card containing the program to be carried out is selected by positioning a marker 16 on the cassette 15 of the conveyor system corresponding to the beginning of a group. The marker can be of the kind illustrated in FIG. 2. The data supplied by the selected card are stored in a buffer store 17 in a form similar to those supplied by the control panel, so that the matrix 12 can read out information either from the control panel or from the store.

The processing assembly 10 will not be described in full since it can have a known construction and, more particularly, can consist of an assembly comprising a liquid scintillation counter with a built-in computer having a central memory, for instance of the type sold by INTERTECHNIQUE under the trade name "Multimat." Similarly, the read-out matrix can have a conventional construction and be very similar to the matrices used for reading data supplied by a teletype punched tape.

Figure 3:
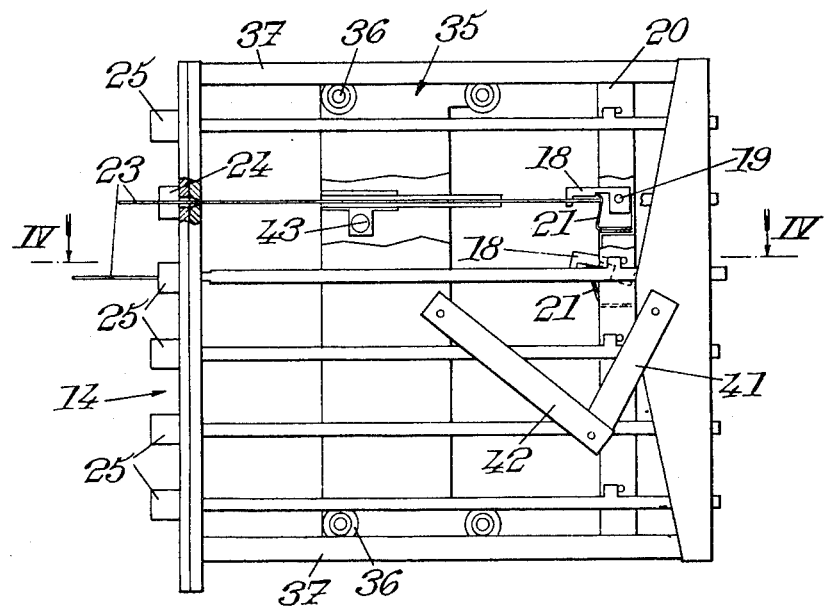
FIG. 3 is a view in elevation and partial section of the card reader, the card disposed at position number three being in process of engagement.
Figure 4:
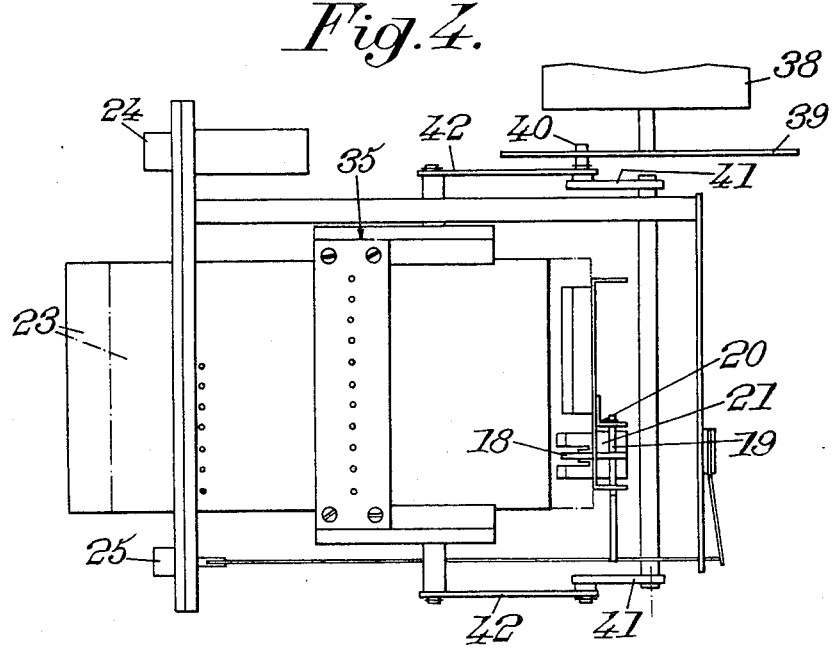
FIG. 4 is a sectional view along line IV—IV of FIG. 3.

Referring to FIGS. 3 and 4, reader 14 has a front panel formed with six slots through which cards may be inserted and removed. Each card after being completely inserted is retained by a lock 18 pivoting on a shaft 19 secured in an aperture in a stationary crosspiece 20 (FIG. 3). A spring strip 21 holds device 18 in position after it has engaged in the corresponding hole 22 in a card 23. Reader 14 is provided with a signal lamp 24 bearing a number on one side of each card slot and with a release push-button 25 on the other side of each slot. When push-button 25 is depressed by the operator, it lifts lock 18 and releases the corresponding strip 21, which ejects the card (as shown in position No. 3 on FIG. 3).

Figure 5:
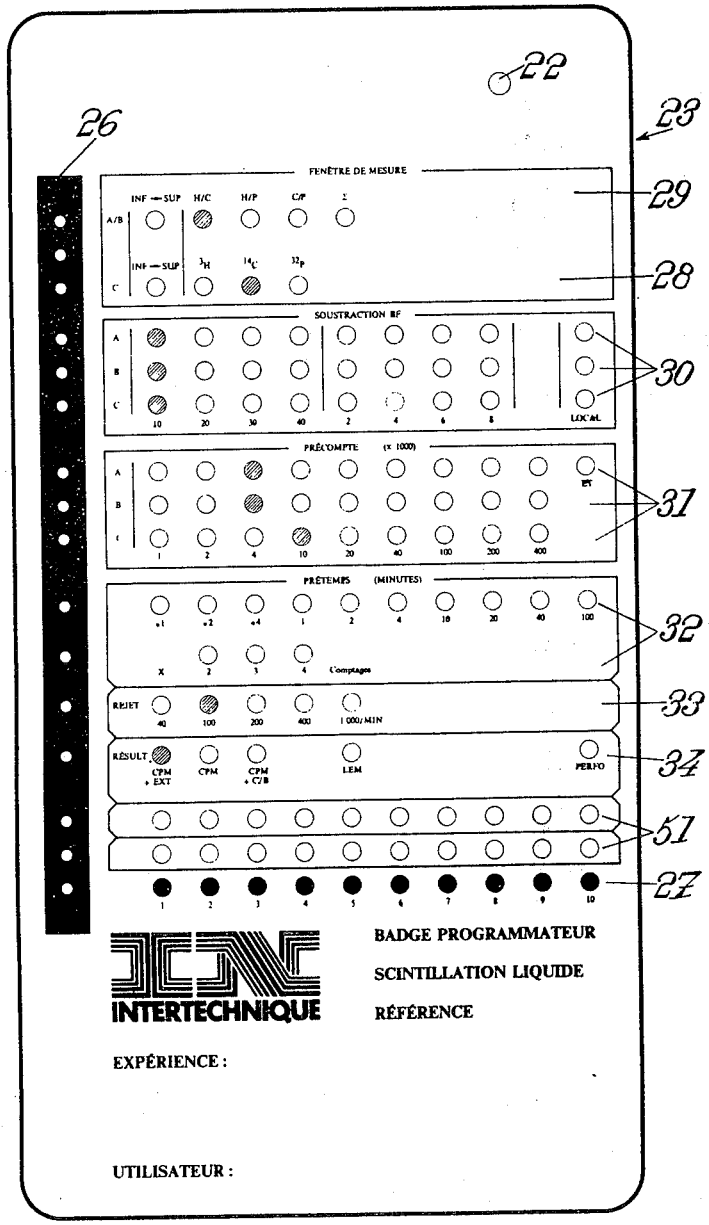
FIG. 5 is a view in elevation of a card for use in the device and adapted for selecting a liquid scintillation counting program.

In a liquid scintillation spectrometer, the card may for instance be as shown in FIG. 5. It comprises a semirigid sheet of transparent material (usually a plastics material or plasticised sheet) on which are printed:

— a column of synchronisation spots 26,

— a plurality of parallel columns of circles forming a corresponding number of programming positions located in transverse rows, each corresponding to a synchronisation spot in column 26. Finally, the card is printed with labels which advantageously correspond with those on the front panel of the spectrometer.

The card shown by way of example in FIG. 5 comprises ten columns and sixteen rows. The first row 27 is made up of dark circles which are adapted for checking the read-out means, as will be shown hereinafter. The other rows are assigned inter alia to the following parameters:

— energy selection window: if the spectrometer is assumed to have three channels A, B and C, depending on the darkened circle in row 28, the window on track C will represent either an adjustable fraction of the energy spectrum, the window corresponding to tritium, or the window corresponding to carbon 14 or to phosphorus 32. Line 29 can be similarly used for choosing the ratio between the windows in channels A and B;

— subtraction of background noise for each channel (rows 30); the number of counts corresponding to the black circles in the corresponding row is subtracted from the gross count;

— selection between preset count (corresponding to rows 31) and preset time counting (rows 32);

— selection of reject rate (row 33);

— selection between methods of computing the net results (row 34). Some rows (two in the case shown) may be left available for parameters to be selected by the operator of for choosing between available program subroutines.

A card of the aforementioned kind has an advantage over a punched card (which may also be used) in that it can easily be modified by erasing data in the event of an error, and no grippers are required.

Reader 14 also comprises read-out means which reads the six successive rows in sequence, starting from row 27 which is used for checking the system. The read-out means comprises a slide 35 provided with rollers 36 rolling along a reader frame 37. An electric motor 38 (FIG. 4) is provided with a twin rod and crank system, which drives the slide backwards and forwards all the way along the card positions. A disc 39 driven by the motor and provided with a stud 40 rotates two cranks 41. Rods 42 are pivotably mounted on the slide and the cranks.

The slide bears six identical optical readers. Each reader comprises a transverse light source 43 (e.g. an incandescent filament) located on one side of a card position, and a row of 11 light sensitive detectors (e.g. infrared diodes) on the other side of the card. The detectors are indicated by points on FIG. 4 and have the same spacing as the circles in any row on a card. During each complete movement of slide 35 from the left to the right of FIG. 3, the optical detectors scan all the rows, starting with row 27, which supplies check pulses. Subsequently, each binary information read from the columns of data, on reception of a pulse from row 27, causes the corresponding data to be written in buffer store 17.

As can be seen, each card constitutes an auxiliary program store. In the embodiment shown on FIG. 1, use is made of a marker disposed in a cassette and an electro-optical reading device 44 borne by a frame on which the cassettes of the conveyor are moved to select that card whose contents is to be transferred to the main store.

Each marker bears a fixed coding, and its top surface bears the number of the corresponding slot in reader 14, so as to facilitate visual identification. In the case shown, seven markers are provided. One, which bears the reference number 0, indicates that the corresponding group of samples is to be processed in accordance with the information on the control panel 11. Consequently, when the code on the marker is read, the only result will be to actuate a relay 45 which brings or holds switch 13 in the continuous-line position in which it is shown in FIG. 1. The address corresponding to each marker 16 is represented in binary code by three bands 46 which extend around a cylindrical part of the marker and can be either absorbent or reflecting. An additional reflecting band 47 is adapted to provide a synchronisation signal for the purpose of reading.

The markers shown in FIG. 1 and 2 fulfil an additional purpose; each marker 16 can be inserted into the cassette in any one out of four positions, in which it is held by a square base 48. In each position, symbols appear on the front surface of the base. The symbols have the following meanings:

DG = beginning of group. When a marker is thus placed in a cassette it indicates that the device contains the first samples of a group which fill a number of subsequent cassettes.

FG = end of a group. When a marker is thus placed, it indicates that the samples in the corresponding cassettes are the last ones belonging to a group filling a number of successive cassettes.

DG/FG = group in a single cassette. The marker indicates that all the samples in a group are placed in the marker equiped cassette.

ET = the cassette contains standardisation samples.

Of course, the number of positions provided can be greater than four and the marks can be different from the aforementioned and can give different information.

The information given on base 48 is reproduced in coded form on two bands 49, different angular positions of which are reflecting.

Reader 44 comprises an illuminating device and seven receiving cells each associated with one of the bands 46, 47 and 49, the signals from which are transmitted to the electronic of programming means 52 associated with reader 14. The operation of the device will be described only briefly, with reference to an example.

When an operator wishes to count in accordance with a program card 23, he looks for an empty slot (e.g. slot number 2) in reader 14. He inserts and locks his card in the slot and positions a marker 16 bearing the address 2 in the first cassette 15 carrying samples to be processed, and inserts a second marker in the last cassette. The first marker is in the position showing the reference FG. Next, the cassettes are placed at successive positions along the conveyor. When the first cassette in the group appears in front of the reader, the reader transmits signals representing address 2 and indicating the beginning of a group. The programming circuit then energizes the read-out means corresponding to the second card in reader 14 and supplies motor 38, which causes slide 35 to reciprocate. During the return journey of the slide, the information on the card is transmitted at output 50 to store 17. At the same time, reader 44 supplies the information that a group is beginning.

Subsequently, samples brought to the operating station are processed in accordance with the program in store 17, up to the end of the cassette which bears a marker which is angularly positioned so as to show reference FG.

Advantageously, the device is designed to prevent damage being caused by an electric breakdown. To this end, it is simply necessary to provide the programmer via a circuit for re-reading the card 23 corresponding to the store address, when the power supply is restored. On the other hand, of course, the card must be left in position in reader 14, but this is an advantage since it shows that the reader is in use.

Sub-routines can of course be provided, inter alia for eliminating a group provided with a marker corresponding to an unoccupied slot or a group having an inconsistent program. Furthermore, each card can carry the address of a particular program permanently recorded in the central store, and can show the instruction for starting the program.

In a modified embodiment, no marker bearing the reference O is provided, and a group is counted with the measuring parameters indicated on the front panel if no card has been placed in the slot corresponding to the marker which precedes the group.

Also, it is not necessary that reading be optical or a binary code is used to identify the markers or the positions of the card reader.

In another modified embodiment, the markers are in the form of plugs of the type shown on FIG. 2a and adapted to close electric contacts carried out by the frame of the system. While the construction and operation of the electric and electronic circuitry is quite similar to those described with reference to FIG. 1, it will be mentioned in some details with reference to FIG. 1a.

The marker plug 16a of FIG. 2a comprises a base member shaped to be received in a cassette and a vertical stem 60. That stem carries a plurality of flanges which may be regarded as belonging to different groups. In addition, the base plate 61 carries a square boss 62 which is adapted to close an additional contact switch for validation purpose, that is which renders effective the electric contacts associated with the flanges.

A first group of three flanges 63 has the same shape on all markers 16a. The three flanges have truncated portions 64, 65 and 66. As a consequence, different combinations of the associated electric contacts are actuated depending upon the angular position of the marker in a cassette.

A second set comprises two flanges each of which is located at either one of four different possible levels. The marker of FIG. 2a, corresponding to program No. 5, has two flanges 67 located at the second and fourth locations from the bottom (the other two levels being indicated in dash-dot lines). Each program number corresponds to a different arrangement.

Last, the different angular positions are indicated by the reference G, Ḡ, GḠ, and S, corresponding to those of the embodiment of FIG. 2 (DG, FG, DG/FG, ET).

Figure 1A:
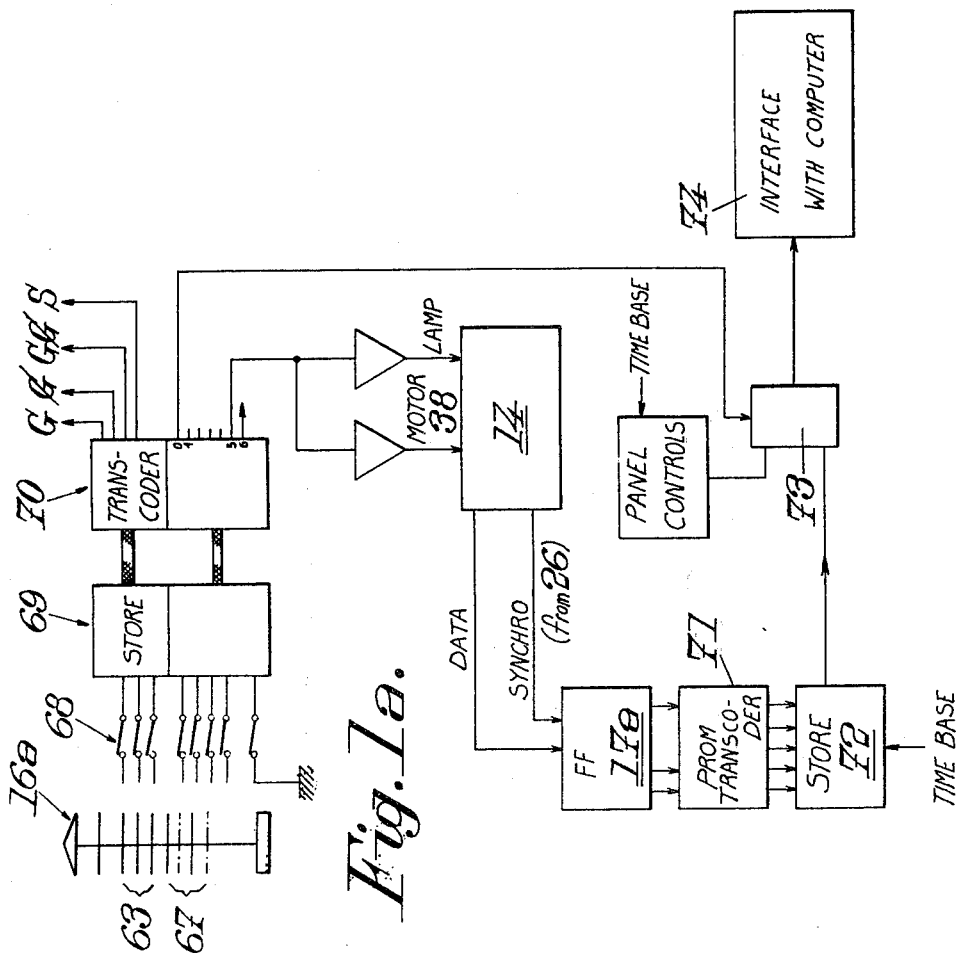

Referring to FIG. 1a, there is shown the main components of the circuit associated with a liquid scintillation spectrometer including a digital computer such as the Multi-8 or Multi-4 computer manufactured by Intertechnique.

The bank of electric contacts 68 operable by the flanges on marker 16a is associated with storage means, for instance in the form of bistable flip-flops which have a permanent power supply (battery of accumulators for instance) for retaining the data read from a marker 16a even in case of electrically power failure. The condition (set or reset) of the flip-flops in the store 69 is communicated to a transcoder 70 (PROM matrix for instance). A transcoder portion responsive to the condition (open or closed) of the electrical contacts actuated by the flanges 63 provides to the system an indication whether the cassette contains the front samples of a group, the tail samples of a group, a complete group, or standards.

The other transcoder portion delivers a signal on either a zero output (which does not correspond to any address in the card reader) or one of outputs 1–6, depending upon those contacts which are closed by flanges 67.

When one of the outputs 1–6 (output 5 for instance) delivers a signal, the motor 38 of the card reader 14 is energised along with the light source which corresponds to the address.

The data read sequentially from the program card located at address number 5 are stored in the memory elements (flip-flops for instance) of a buffer store 17a. Synchronisation is obtained using the signals derived from column 26.

The data read from 17a by a transcoder 71 are delivered to an intermediate store 72.

Last, switching means 73 controlled by the "zero" output of transcoder 70 delivers on its output either the data in binary form read from store 72 or those received from a transcoder associated with the manually settable panel controls. In either case, the store or transcoder is read sequentially in time dependence with the time base of the computer which receives the data through an interface 74. Since the spectrometer per se is of a type well known to those familiar with liquid scintillation spectrometry, it does not appear necessary to describe it further.

The invention improves over the prior art in a number of aspects. Programming is simple and easy, particularly if the card bears information which, in simplified form, reproduces those of the front panel of the apparatus. Correction in the event of an error is extremely simple; solvents can be used for erasures or deletions without the need for a new card. The circles are possibly marked so that they do not disappear during erasures. Once prepared, a card can be re-used indefinitely and can form an archive (in photocopy form if required) and can be stored with the batch of cassettes containing the samples for processing. The machine operator does not need to be familiar with programming techniques, since his only task is to place the card in an empty slot and insert a corresponding marker in the first and the last cassette of the batch containing the group of samples.

I claim:

1. A device for selecting a program to be carried out by an apparatus on a group of samples disposed in successive sample receiving locations of a conveyor of the apparatus, said conveyor being constructed to bring said locations to a working station in seriatim order, wherein said device comprises a plurality of markers each adapted to be removably located in said conveyor for movement by said conveyor along with said samples, and each provided with a different address code; auxiliary stores in the form of cards each bearing one of said programs; read out means having a plurality of addressable card receiving locations and means for reading the card located at an addressed location; means for reading the address code of each marker as it is moved toward the working position for causing said read out means to read the card at the location having the address read by said reading means and for transferring the program read out from the card to storage means controlling the process carried out by said system.

2. In an apparatus for measuring the radio-activity of successive samples carried by successive cassettes of said conveyor means, each said cassette having a plurality of sample receiving locations, a device according to claim 1 wherein each marker comprises an element which is positioned in the first cassette containing samples of a group to arrive at the working station.

3. A device according to claim 1, wherein each card bears a diagrammatic representation of a control panel of the apparatus and said device includes one additional marker provided with a coded address resulting in transfer of a program set manually on the control panel.

4. A device according to claim 3, wherein each said card comprises a number of predetermined and visually identifiable positions, disposed in columns and rows, the columns being arranged to be successively read by optical readers of said read out means and the number of readers being equal to the number of columns, and each row comprising a position occupied by a synchronisation mark.

5. A device according to claim 4, wherein each out of a plurality of said rows bears indications for programming a particular operating parameter selected from the group consisting of energy selection windows, subtraction of background noise, determination of precount or pretime counting, and minimum count reject.

6. A device according to claim 1, wherein the read-out apparatus has a number $n$ of card receiving positions ($n$ being a predetermined integer), each having an address corresponding to a marker and actuated, when the marker arrives at a read-out station, so as to supply the data on the card successively to a main store of the system.

7. A device according to claim 2, wherein each said marker is insertable in the cassette in either of a plurality of angular positions, indicating whether the loading device contains the first samples in a group, the last samples in a group, an entire group, or standard samples.

8. In a radio-activity measuring system having conveyor means formed with a plurality of sample receiving locations and means for actuating said conveyor means along a path which brings said locations in succession to a working station for measurement of the radio-activity of the sample brought to said location, a device for selecting a measuring program to be carried out on a group of said samples, comprising a plurality of markers, each constructed to be removably located in said conveyor for movement by said conveyor along with said samples and each provided with a different address code, auxiliary stores in the form of cards each bearing one of said programs, read-out means having a plurality of addressable card receiving locations and means for reading the card located at an addressed location, means for reading the address code of each marker as it is moved toward the working position for causing said read out means to read the card at the location having the address read by said reading means and for causing said system to operate according to said program.

* * * * *